United States Patent [19]

Montefusco

[11] 4,021,744
[45] May 3, 1977

[54] DEMODULATOR FOR FREQUENCY-KEYED COMMUNICATION SYSTEM

[75] Inventor: Nicola Montefusco, Milan, Italy

[73] Assignee: Societa Italiana Telecomunicazioni Siemens S.p.A., Milan, Italy

[22] Filed: Mar. 17, 1976

[21] Appl. No.: 667,499

[30] Foreign Application Priority Data

Mar. 18, 1975 Italy .................................. 21368/75

[52] U.S. Cl. ............................. 329/105; 178/66 A; 325/320; 329/126
[51] Int. Cl.² ...................... H03D 3/00; H03K 9/06; H04L 27/14
[58] Field of Search .......... 329/104, 105, 110, 126; 325/320; 178/66 A

[56] References Cited

UNITED STATES PATENTS

| | | | |
|---|---|---|---|
| 3,614,639 | 10/1971 | Belman | 329/104 |
| 3,660,771 | 5/1972 | Balugani et al. | 329/104 |
| 3,979,685 | 9/1976 | Motley et al. | 329/105 |

*Primary Examiner*—Siegfried H. Grimm
*Attorney, Agent, or Firm*—Karl F. Ross; Herbert Dubno

[57] ABSTRACT

At the receiving end of a communication system utilizing a higher keying frequency $F_A$ and a lower keying frequency $F_Z$ for the transmission of information, a counter is stepped by clock pulses having a cadence $F_c \gg F_A$. A train of short signal pulses, derived from the incoming wave and coinciding with the zero crossings thereof, is used to reset the counter whose output is delivered to a digital comparator also receiving a fixed reference number not less than and preferably equal to the count of clock pulses generated during a half-cycle of frequency $F_A$. Whenever the output of the counter surpasses that reference number, the comparator has an output yielding, upon integration in a low-pass filter, a low-frequency wave which can be squared with the aid of a threshold circuit.

5 Claims, 2 Drawing Figures

DEMODULATOR FOR FREQUENCY-KEYED COMMUNICATION SYSTEM

FIELD OF THE INVENTION

My present invention relates to a demodulator for a communication system of the type wherein two keying frequencies are alternately generated to transmit information, e.g. as dots and dashes of the Morse code or as marks and spaces of the Baudot code.

BACKGROUND OF THE INVENTION

In commonly owned U.S. Pat. No. 3,660,771 there has been disclosed a demodulator of this type including a pulse counter which is stepped by clock pulses of a cadence substantially exceeding the higher keying frequency, the counter being reset by signal pulses derived from the incoming wave with the aid of a zero-crossing detector. With a signal pulse generated at each zero crossing, the counter has a storage capacity not less than and preferably equal to a number of clock pulses occurring during a half-cycle of the higher keying frequency so as to be reset when the incoming oscillation is of that frequency but to emit an output pulse when that frequency is lower, i.e. when the other keying frequency is being received. The output pulse of the counter sets a flip-flop which is reset simultaneously with the counter by the same signal pulse. The pulse sequence provided in this instance by the flip-flop is integrated in a low-pass filter which works into a threshold circuit so as to generate a binary voltage varying between zero and a predetermined level in conformity with the alternations of the input oscillations between the higher and the lower keying frequency.

Such a demodulator is very useful as a frequency discriminator in data transmission and voice-frequency telegraphy since it allows the use of keying frequencies differing by as little as 15% of the magnitude of the lower frequency. For the sharpest possible discrimination between two closely adjoining frequencies it is necessary to hold the storage capacity close to the number of clock cycles per half-cycle of the higher keying frequency; since the source of clock pulses is not synchronized with the incoming oscillation, that number may vary by one pulse which introduces a certain uncertainty into the parameter to be measured, i.e. the length of a half-cycle of the higher keying frequency. To minimize this uncertainty it is desirable to make the clock-pulse cadence very large in comparison with the keying frequency. With these close pulse spacings, however, it may happen that delays in pulse transmission retard the setting (or resetting) of the flip-flop in a manner resulting in an incorrect identification of the incoming frequency.

OBJECT OF THE INVENTION

The object of my present invention, therefore, is to provide an improved demodulator of the character referred to capable of distinguishing more positively between two closely adjoining input frequencies.

SUMMARY OF THE INVENTION

I realize this object, in accordance with the present invention, by connecting the pulse counter of the aforedescribed demodulator to a digital comparator which is preset to a selected reference number not less than and preferably equal to the count of clock pulses occurring between successive signal pulses derived from the higher keying frequency; whenever the reading of the counter exceeds that reference number, an output signal is emitted which is converted by conventional integrating circuitry — similar to that disclosed in the above-discussed patent — into a binary voltage varying with the frequency of the incoming oscillation. As in the system of the prior patent, the number $k$ of signal pulses per cycle of that oscillation is preferably equal to 2.

BRIEF DESCRIPTION OF THE DRAWING

The above and other features of my invention will now be described in detail with reference to the accompanying drawing in which.

SPECIFIC DESCRIPTION

Figure 1:
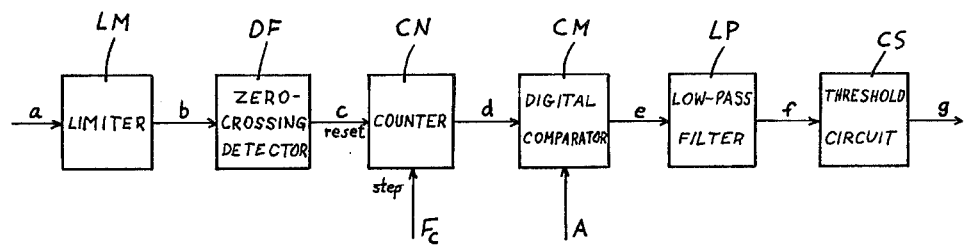
FIG. 1 is a block diagram of my improved frequency discriminator or demodulator.
Figure 2:
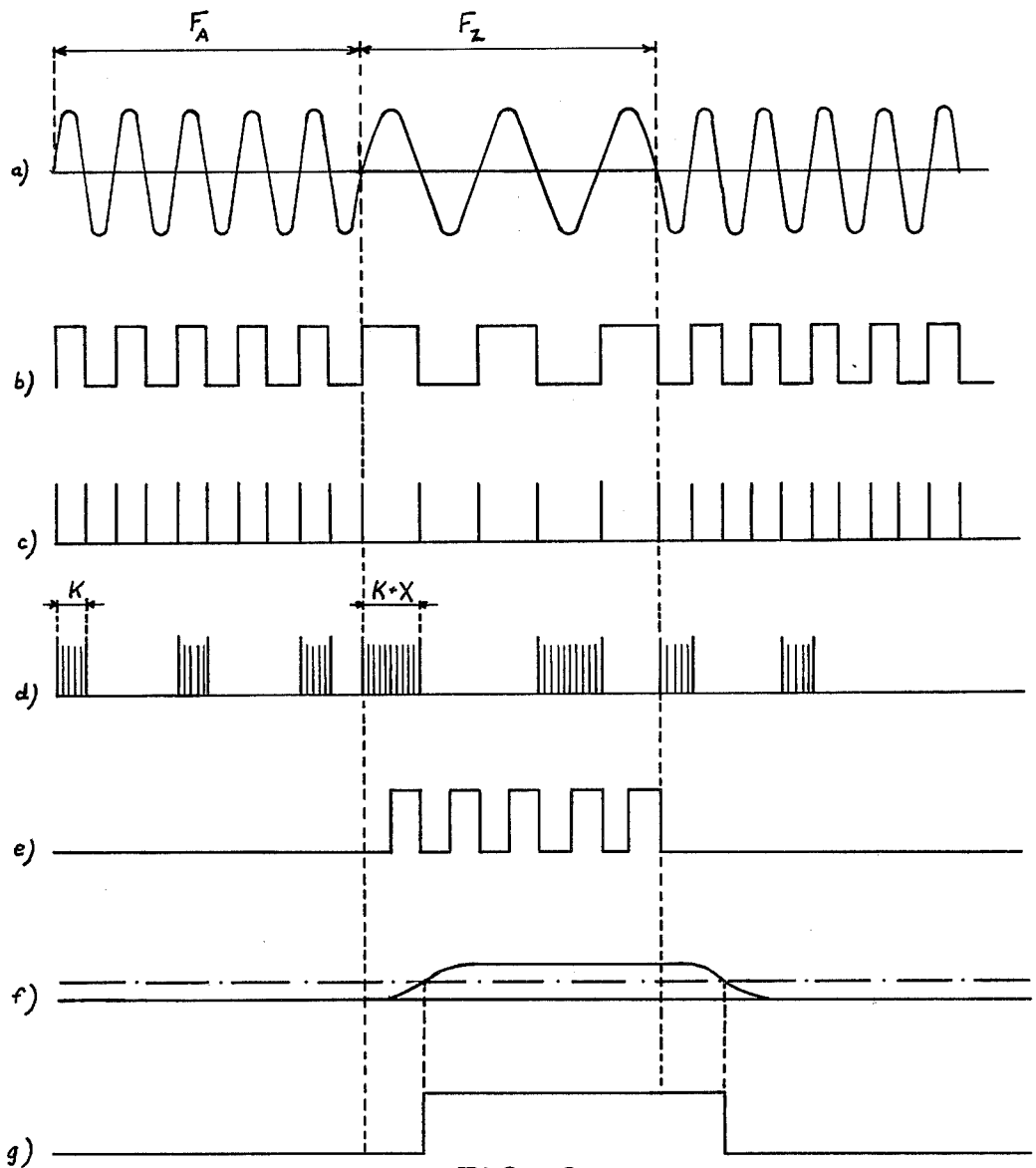
FIG. 2 is a set of graphs relating to the operation of the demodulator shown in FIG. 2.

In FIG. 1 I have shown an amplitude limiter LM receiving an incoming oscillation $a$ which alternates between two keying frequencies $F_A$ and $F_Z$, as illustrated in graph a of FIG. 2; frequency $F_A$ is the higher of the two. Limiter LM delivers a square wave $b$, illustrated in the corresponding graph of FIG. 2, to a zero-crossing detector DF which may be of the type disclosed and claimed in the commonly owned U.S. Pat. No. 3,660,771. Detector DF delivers a train of signal pulses $c$, see corresponding graph of FIG. 2, to a resetting input of a pulse counter CN whose stepping input receives a succession of clock pulses of cadence or repetition frequency $F_c \gg F_A$. The reading $d$ of pulse counter CN, fed to a digital comparator CM, is a count K in the presence of the higher keying frequency $F_A$ and a count K + X in the presence of the lower keying frequency $F_Z$ as shown in graph d of FIG. 2. This count is checked in comparator CM against a fixed numerical value A which should be not less than the count K obtained from keying frequency $F_A$ but well below the count K + X obtained from keying frequency $F_Z$. Since the count K is subject to a one-pulse variation, reference number A should correspond to the larger of the two possible values of K.

Comparator CM emits a signal $e$ which, as seen in the graph so labeled in FIG. 2, is a sequence of rectangular pulses coinciding with respective half-cycles of wave $F_Z$. These pulses are integrated in a low-pass filter LP whose output voltage $f$, upon surpassing a level V established by a threshold circuit CS, gives rise to a rectangular pulse $g$ as illustrated in the two bottom graphs of FIG. 2.

It will thus be clear that the appearance or nonappearance of a pulse $e$ in the output of digital comparator CM depends entirely on the numerical value of the reading of pulse counter CN and is not as much affected by transmission delays as the flip-flop included in the demodulator of the prior patent.

A particular advantage of my improved frequency discriminator is its adaptability to different sets of keying frequencies, e.g. in a multichannel telecommunication system using about fifty channels for voice-frequency telegraphy or about ten channels for data transmission. Thus, the number A applied to the reference input of comparator CM can be easily chosen to correspond to the pulse count occurring with the higher frequency of a given channel, without the need for any other adjustment.

I claim:

1. In a communication system having means for transmitting information by the alternation of a relatively high keying frequency $F_A$ with a relatively low keying frequency $F_Z$, a demodulator for said information comprising:
   receiving means for an oscillation containing said keying frequencies;
   circuit means for deriving $k$ signal pulses per cycle from said oscillation, $k$ being an integer;
   a source of clock pulses of a cadence $F_c \gg F_A$;
   a pulse counter with a stepping input connected to said source for receiving said clock pulses and with a resetting input connected to said circuit means for receiving said signal pulses;
   a digital comparator connected to said counter and preset to a selected reference number for emitting an output signal upon the reading of said counter exceeding said reference number, the latter being at least equal to the number of clock pulses occurring between successive signal pulses derived from said keying frequency $F_A$; and
   integrating circuitry connected to said comparator for converting said output signal into a binary voltage varying with the frequency of said oscillation.

2. A demodulator as defined in claim 1 wherein said reference number is equal to the number of clock pulses occurring in each half-cycle of said keying frequency $F_A$, with $k = 2$.

3. A demodulator as defined in claim 2 wherein said circuit means comprises a zero-crossing detector.

4. A demodulator as defined in claim 1 wherein said integrating circuitry comprises a low-pass filter.

5. A demodulator as defined in claim 4, further comprising a threshold circuit connected in cascade with said low-pass filter.

* * * * *